United States Patent [19]

Ozeki et al.

[11] 3,819,868

[45] June 25, 1974

[54] COMMON CONTROL SWITCHING NETWORK FOR TELEGRAPH AND TELEPHONE EXCHANGE

[75] Inventors: Kazuya Ozeki; Haruo Mochizuki; Hiroaki Sasahara, all of Tokyo, Japan

[73] Assignee: Nippon Electric Company, Limited, Tokyo, Japan

[22] Filed: Dec. 6, 1972

[21] Appl. No.: 312,524

[30] Foreign Application Priority Data

Dec. 8, 1971 Japan .............................. 46-99671

[52] U.S. Cl. .................................. 179/18 C, 179/3

[51] Int. Cl. ............................................ H04q 3/42

[58] Field of Search .............................. 179/3, 18 C

[56] References Cited

UNITED STATES PATENTS 3,227,806 1/1966 Kreuzer ................................ 179/3

3,475,557 10/1969 Morse et al. ........................ 179/3 X

*Primary Examiner*—William C. Cooper

*Attorney, Agent, or Firm*—Sughrue, Rothwell, Mion, Zinn & Macpeak

[57] ABSTRACT

Each link of a common control switching network is capable of transmitting either a telegraph or a telephone signal. Each telegraph and telephone interface device is divided into two portions, one for the transmission of telegraph or telephone signals and the other for transmitting a control signal accompanying the telegraph or the telephone signal between the remaining portion of the interface device and common control equipment. Responsive to the control signal accompanying either telegraph or the telephone signals, the common control equipment makes one of the links establish a connection between two of the interface devices for transmission of the telegraph or the telephone signal accompanied by the control signal between the two interface devices.

1 Claim, 6 Drawing Figures

COMMON CONTROL SWITCHING NETWORK FOR TELEGRAPH AND TELEPHONE EXCHANGE

BACKGROUND OF THE INVENTION

This invention relates to a common control switching network operable to establish connections for direct-current and alternating-current signals. As is well known, a telegraph line makes use of direct-current signals while telephone and data lines (hereafter referred to merely as a telephone line) primarily employ alternating-current signals. A switching network according to the present invention is therefore operable to establish the desired connections between the telegraph lines and between the telephone lines.

It has hitherto been customary to use separate switching networks adapted exclusively for telegraph lines or for telephone lines because of the difference between the principles of information transmission in a telegraph and a telephone line. In other words, it has been necessary to install both a telegraph and a telephone switching network in a central office serving a plurality of telegraph and telephone subscribers. This renders the installation expensive and bulky and requires an increased amount of maintenance work. Furthermore, this limits the flexibility of the office installation to an increase in the number of telegraph subscribers and a consequent decrease in the number of telephone subscribers and a like change in the number of telegraph and telephone subscribers.

SUMMARY OF THE INVENTION

It is therefore an object of the instant invention to provide a common control switching network operable to establish telegraph and telephone connections. This makes it possible to equip a central office of the comparable scale and installation cost with a switching network having an increased number of lines and to increase the quality and flexibility of service.

According to this invention, there is provided a common control switching network for direct-current and alternating-current signals including a link device, a plurality of direct-current devices, each capable of conveying a direct-current signal and a control signal accompanying said direct-current signal, a plurality of alternating-current devices, each capable of conveying an alternating-current signal and a control signal accompanying said alternating-current signal, and common control equipment responsive to the control signal accompanying a direct-current signal for making said link device establish a connection between two of said direct-current devices for the last-mentioned direct-current signal and responsive to the control signal accompanying an alternating-current signal for making said link establish a connection between two of said alternating-current devices for the last-mentioned alternating-current signal, wherein the improvement comprises a plurality of links provided in said link device, each capable of transmitting either a direct-current or an alternating-current signal, and an interface device provided in each of said direct-current and alternating-current devices for transmitting the control signal accompanying either the direct-current or alternating-current signal between the direct-current or alternating-current device in which the interface device is provided and said common control equipment, said common control equipment making one of said links establish said connection.

The link device may either be a main link frame, such as a combination of a line link frame (LLF), a trunk link frame (TLF), and junctors, or an auxiliary link frame, such as a sender link or a register sender link, and comprise crossbar switches. The direct-current and alternating-current devices may be line circuits, trunk equipment, and/or numerical signal senders.

It is noted, in connection with this invention, that a telegraph system and a telephone system are basically different. In a telegraph system, a substation sends out and/or receives direct-current telegraph signals representative of telegraph codes. In a telephone system, a substation sends out and receives an alternating-current telephone signal representative either of speech or data. It is furthermore noted that a common control switching network consists, in principle, of a link device, a plurality of interface devices, each functioning as an interface between the link device and a telegraph or a telephone line, and common control equipment for controlling the link device to establish connections between desired pairs of telegraph lines and between desired pairs of telephone lines. The interface devices have functions and characteristics determined by the information transmission principles particular to a telegraph and a telephone system. It is therefore next to impossible to use a single interface device for both telegraph and telephone services. With the link device, wheather it be of the space or the time division type, it is easy to make the frequency characteristics, the distortion, the noise, and the like adapt to the telegraph and the telephone signals in principle. The common control equipment has no direct concern with the transmission of telegraph and telephone signals. In consideration of the above, it is hereby proposed to use a single common control equipment for both telegraph and telephone services and to divide each interface device into a first portion for conveying a telegraph or telephone signal and a second portion, of a predetermined structure serving as an interface between the first portion and the common control equipment.

More particularly, usual numerical signals used in a telegraph system are dial impulses and/or telegraph codes and those used in a telephone system are dial impulses and/or multifrequency signals. In view of the numerical signals and the supervisory techniques carried out by the busy signals and other supervisory signals, the numerical signal registers and senders, such as the incoming register trunks (ICT), the senders (OS), or the numerical signal registers for the originating register trunks (ORT), of the telegraph system should be different from those of the telephone system. It should, however, be noted that a numerical signal register, for example, comprises means for receiving the numerical signal, means for registering the received numerical signal, and an interface between the receiving and registering means and the common control equipment and that it is possible in accordance with this invention to use an interface of a predetermined structure in both the telegraph and telephone systems. If the dial impulses are resorted to in both telegraph and telephone systems, it is possible to simplify the switching network by adopting numerical signal registering means of the identical construction in all telegraph and telephone numerical signal registers. As regards the switching, channel switching is very often employed in both telegraph and telephone systems to provide similar patterns of connection for both systems. Even if intra-office transmission switching is partly adopted in the telegraph system, this invention is applicable with the intra-office reperforators (IRP) and the intra-office transmitters (IT) being used exclusively in the telegraph system and with the common control equipment being operated in response to a control signal accompanying a telegraph signal including the information relating to the service class to discriminate between the connection patterns and the control functions to be effected. Even if the telegraph and the telephone lines are a mixture of two-wire and four-wire circuits and, as the case may be, other multi-wire circuits, it is also possible to adopt this invention with the common control equipment being operated in compliance with the information concerning the service classes for determining the types of the circuits used and for carrying out further discrimination between the connection patterns. Under some circumstances, it may be necessary to provide the common control equipment with some other specific control capabilities for either or both the telegraph and telephone services. In accordance with this invention, it is feasible to take the specific capabilities into consideration insofar as the consideration neither affects the basic control functions nor much increases the cost.

DESCRIPTION OF THE PREFERRED EMBODIMENTS

Figure 1:
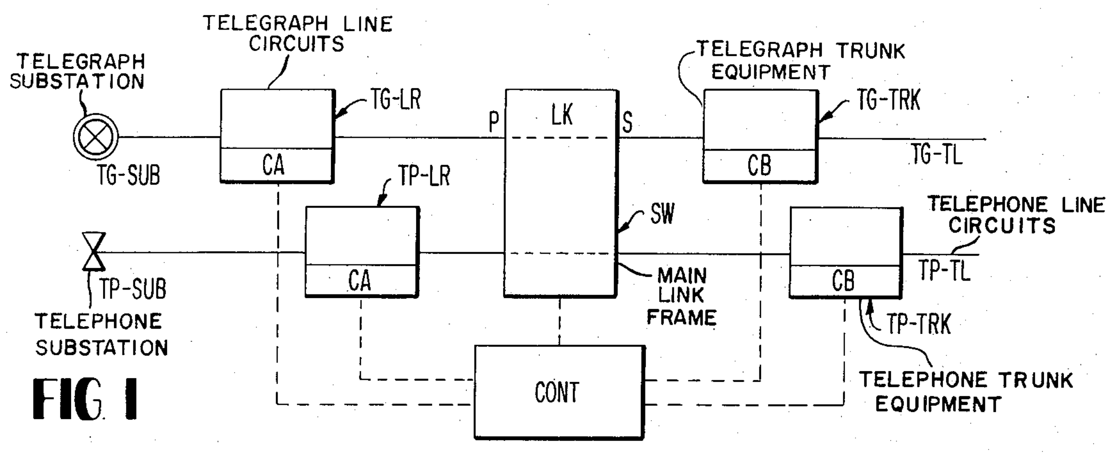
FIG. 1 is a block diagram of a first embodiment of the present invention.

Referring to FIG. 1, a common control switching network, to which the instant invention is applicable, comprises a main link frame SW having a primary side P and a secondary side S, a plurality of telegraph line circuits, such as TG-LR, each interposed between the primary side P of the main link frame SW and a telegraph substation TG-SUB, a plurality of telegraph trunk equipments, such as TG-TRK, each interposed between the secondary side S of the main link frame SW and a telegraph trunk line TG-TL, a plurality of telephone line circuits, such as TP-LR, each interposed between the primary side P of the main link frame SW and a telephone substation TP-SUB, a plurality of telephone trunk equipments, such as TP-TRK, each interposed between the secondary side S of the main link frame SW and a telephone trunk line TP-TL, and common control equipment CONT for controlling the operation of the main link frame SW, line circuits, such as TG-LR and TP-LR, and trunk equipment, such as TG-TRK and TP-TRK. It is to be understood that the trunk lines, such as TG-TL and TP-TL, are connected to a similar switching network installed in a plurality of remote offices (not shown), that some of the trunk equipment, such as the outgoing trunks (OGT), may further be connected to the primary side P, and that some of the trunk equipment, such as the intra-office trunks (IOT), may not be connected to the interoffice trunk lines but to other positions on the secondary side S of the main link frame SW. In accordance with this invention, each of the telegraph line circuits, such as TG-LR, is divided into a first portion for conveying the telegraph signal and a control signal accompanying the telegraph signal and a second portion, such as CA, serving as an interface between the accompanying first portion and the common control equipment CONT. Similarly, each of the telephone line circuits, such as TP-LR, is divided into a first portion for conveying the telephone signal and a control signal accompanying the telephone signal and a second portion, such as CA, serving as an interface between the associated first portion and the common control equipment CONT. These second portions CA are of identical construction. Each telegraph trunk equipment, such as TG-TRK, is divided into a first portion for conveying the telegraph signal and a control signal accompanying the telegraph signal and a second portion, such as CB, serving as an interface between the related first portion and the common control equipment CONT. Likewise, each telephone trunk equipment, such as TP-TRK, is divided into a first portion for conveying the telephone signal and a control signal accompanying the telephone signal and a second portion, such as CB, of the identical construction as the second portions of the other telephone trunk equipment and the telegraph trunk equipment, such as TG-TRK, serving as an interface between the concerned first portion and the common control equipment CONT. The main link frame SW comprises a plurality of links LK, each capable of transmitting both telegraph and telephone signals. Responsive to the control signal accompanying a telegraph signal, the common control equipment CONT makes one of the links LK establish a connection through a pair of first portions of the telegraph line circuit and the telegraph trunk equipment, such as TG-LR and TG-TRK, which convey the telegraph signal. Responsive to the control signal accompanying a telephone signal, the common control equipment CONT makes one of the links LK establish a connection through a pair of the first portions of the telephone line circuit and the telephone trunk equipment, such as TP-LR and TP-TRK, for the telephone signal.

Figure 2:
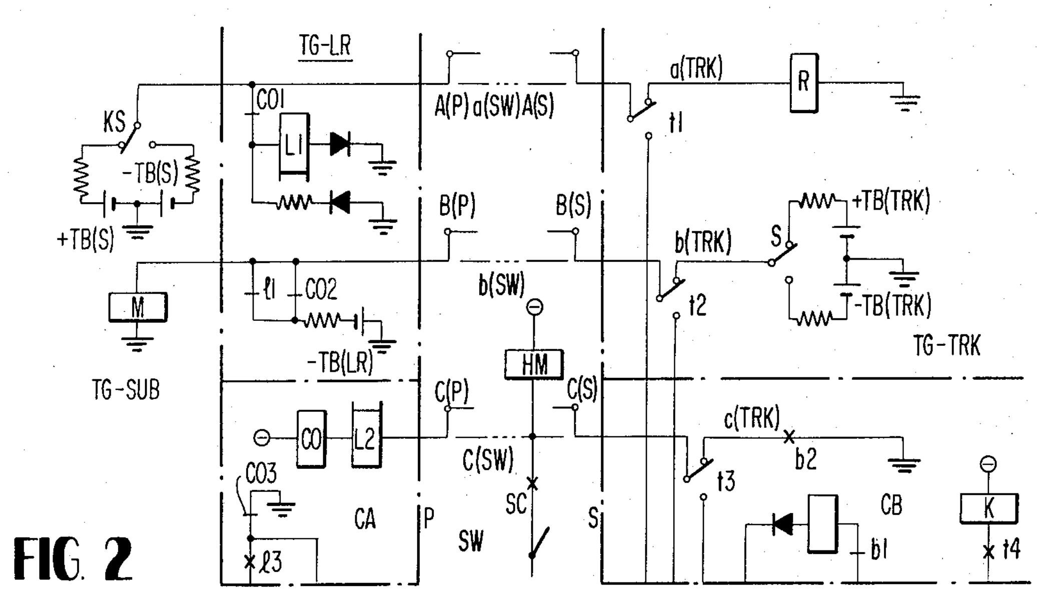
FIG. 2 shows those circuits of a telegraph substation, a telegraph line circuit, a portion of a main link frame, and a telegraph trunk equipment which are effected by the first embodiment depicted in FIG. 1.

Referring to FIG. 2, a telegraph substation TG-SUB illustrated therein by way of example is of the double-current type and comprises a pair of direct-current sources +TB(S) and −TB(S), a double-current key KS manually or automatically operable to transmit a series of double-current telegraph codes to a desired local or remote telegraph substation (not shown) of similar construction selected by a numerical signal produced in the known manner in the illustrated substation TG-SUB, and a receiver relay M for receiving a series of double-current telegraph codes sent from a similar local or remote telegraph substation (not shown) that has selected the depicted substation TG-SUB. The link interface of a telegraph line circuit TG-LR for the illustrated substation TG-SUB comprises a first winding L1 of a conventional L relay operated in the known manner by a call originating with the illustrated substation TG-SUB through a first break contact *co*1 of a conventional Co relay and a direct-current source −TB(LR) for supplying the receiving relay M of the associated substation TG-SUB with a negative polarity direct current through either a break contact *l*1 of L relay or a second break contact *co*2 of the Co relay when the receiving relay M is not busy. The link interface of a telegraph trunk equipment TG-TRK connected either to a telegraph interoffice trunk line (not shown) or a telegraph intra-office trunk line (not show, by this expression another position on the secondary side S of the main link frame SW being also meant) comprises a repeating relay R for receiving the telegraph codes sent from a local originating telegraph substation, such as the depicted substation TG-SUB, for transmission to the trunk line, a pair of direct-current sources +TB(TRK) and −TB(TRK), a double-current contact S responsive to the telegraph signal received through the trunk line for transmitting a series of double-current telegraph codes to a called local telegraph substation, such as the illustrated substation TG-SUB, an *a* wire *a*(TRK) connected to the repeating relay R, a *b* wire *b*(TRK) connected to the double-current contact S, and a first and a second transfer contact *t*1 and *t*2 of a conventional T relay. The power sources −TB(LR), +TB(TRK), and −TB(TRK) may be common to a plurality of similar circuits.

Figure 3:
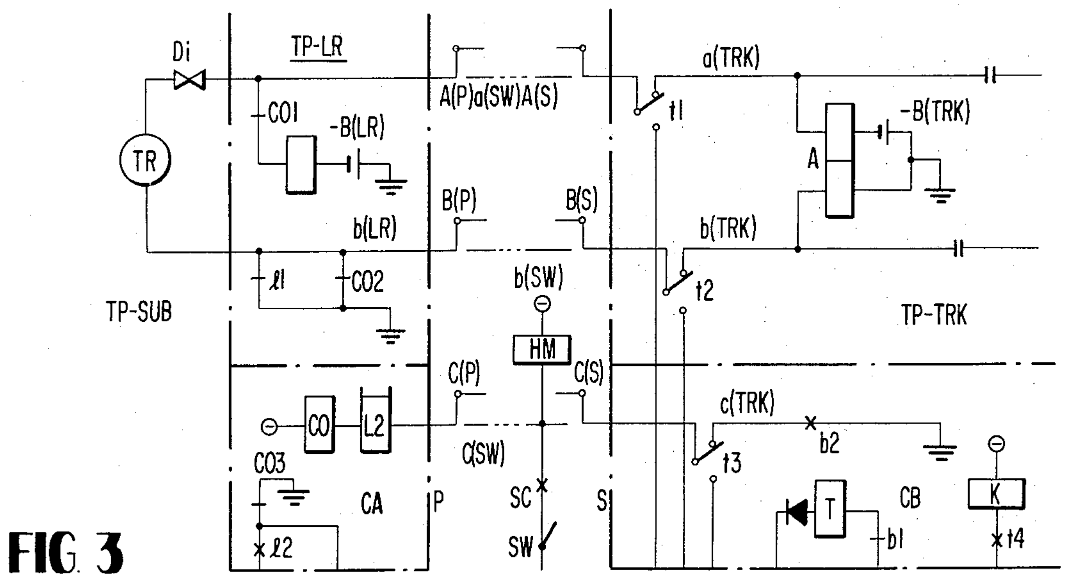
FIG. 3 shows like circuits of the like units of the first embodiment for transmission of the telephone signals and the control signals, together with another portion of the main link frame.

Referring to FIG. 3, a telephone substation TP-SUB illustrated therein by way of example is of the dial impulse type and comprises a transmitter TR and a dial impulse contact Di. The link interface of a telephone line circuit TP-LR for the depicted substation TP-SUB comprises a relay power source −B(LR) which may be common to a plurality of telephone line circuits, a first winding L1 of a conventional L relay operated in the known manner by a call originating with the illustrated substation TP-SUB through a first break contact *co*1 of a conventional Co relay and a circuit for connecting the socalled *b* wire *b*(LR) to ground through either a break contact *l*1 of the L relay or a second break contact *co*2 of the Co relay when the associated substation TP-SUB is idle. The link interface of a telephone trunk equipment TP-TRK connected either to a telephone interoffice trunk line (not shown) or a telephone intra-office trunk line (not shown, by this expression another position on the secondary side S of the main link frame SW being also meant) comprises a relay power source −B(TRK) which may be common to a plurality of similar trunk equipment, an *a* wire *a*(TRK), a *b* wire *b*(TRK), a sophisticated A relay A connected to the *a* and the *b* wires *a*(TRK) and *b*(TRK), and a first and a second transfer contact *t*1 and *t*2 of a conventional T relay.

Referring to FIGS. 2 and 3, the main link frame SW depicted therein by way of example is of the three-wire type and comprises a plurality of links, each in turn comprising an *a*, a *b*, and a *c* wire *a*(SW), *b*(SW), and *c*(SW). The links are accompanied by switches, such as known crossbar switches, each illustrated with symbolic contacts A(P), B(P), and C(P) on the primary side P and also with symbolic contacts A(S), B(S), and C(S) on the secondary side S. The *c* wire *c*(SW) of each link is coupled to the common control equipment CONT through a make contact *sc* of a conventional SC relay (not shown) and is connected to a switch operating relay HM which is operable by the common control equipment CONT to establish a connection between a desired pair of link interfaces of a telegraph line circuit and a telegraph trunk equipment or of a telephone line circuit and a telephone trunk equipment. For transmission of the telegraph signals, an *a* wire *a*(SW) transmits the telegraph signal sent from a local originating telegraph substation through the telegraph line circuit connected thereto to telegraph trunk equipment and the associated *b* wire *b*(SW) transmits the telegraph signal sent from the trunk line connected to the last-mentioned trunk equipment to the last-mentioned substation. Alternatively, a *b* wire *b*(SW) transmits the telegraph signal sent from a trunk line through the trunk equipment connected thereto to a local telegraph substation through the telegraph line circuit connected thereto and the associated *a* wire *a*(SW) provides a telegraph signal transmission path leading from the last-mentioned substation to the last-mentioned trunk line. For transmission of the telephone signals, an *a* wire *a*(SW) and the related *b* wire *b*(SW) form a subscriber's loop together with a telephone substation, the telephone line circuit connected thereto, and the A relay of a telephone trunk equipment. In any event, the concerned *c* wire *c*(SW) serves as a control line for holding and releasing the transmission path.

Further, referring to FIGS. 2 and 3, the controller interface CA of a line circuit TG-LR or TP-LR comprises a second winding L2 of the L relay whose first winding L1 is operable in the link interface of the same line circuit TG-LR or TP-LR as may be energized in the known manner by a call arriving thereat through a trunk line, the trunk equipment connected thereto, and the *c* wire *c*(SW) of a link. The controller interface further comprises a similarly operable Co relay and a connector circuit extending to the common control equipment CONT and including a make contact *l*2 of the L relay and a third break contact *co*3 of the Co relay. The controller interface CB of trunk equipment TG-TRK or TP-TRK comprises a connector relay T operated by the common control equipment CONT through a break contact b1 of a sophisticated B relay (not shown) operated while the trunk equipment TG-TRK or TP-TRK is busy and a *c* wire *c*(TRK) having a make contact *b*2 of the B relay for connected to ground the *c* wire *c*(SW) of the link and a third transfer contact t3 of the T relay Referring to FIG. 4, the common control equipment CONT comprises a start relay MST connected to the line circuits TG-LR and TP-LR and operated upon closure of the make contact *l*2 due to energization by an originating call of the L relay of one of the line circuits for starting the control operation of the common control equipment CONT, a tree circuit 11 coupled to the line circuits TG-LR and TP-LR for completing a connection to one of the line circuits that is determined by a call arriving thereat in the known manner through a trunk line, and a line circuit test relay LFT coupled to the line circuits TG-LR and TP-LR through the tree circuits 11 and prevented by the third break contact *co*3 from being energized when the line circuit under test is busy. The common control equipment CONT further comprises a route selection circuit 12 for selecting at least one trunk equipment, such as TG-TRK or TP-TRK, in compliance with the route to which the originating cell should be directed and a sequence circuit 13 for selecting an idle one of the trunk equipments TG-TRK or TP-TRK, energizing the T relay of the idle trunk equipment through the break contact *b*1. The common control equipment CONT still further comprises a link test relay LT for testing for the presence and absence of ground on each wire of those links through the link test contact *sc* of the SC relay operated by the common control equipment CONT which are selected in the known manner in consideration of the line circuit and the trunk equipment, such as TG-LR and TG-TRK or TP-LR and TP-TRK, to be connected and a direct-current source +B(CONT) for the link operating relays HM for operating one thereof through one of the transfer contacts, such as the one illustrated without the legend, to make the related switch establish a connection between the line circuit and the trunk equipment. The first through the third transfer contacts *t*1 through *t*3 of the operated T relay enables a link test circuit 14 to test the performance of the link, the line circuit, and the substation. In the example being illustrated, the common control equipment CONT releases the T relay after the link test and terminates its control operation.

Figure 4:
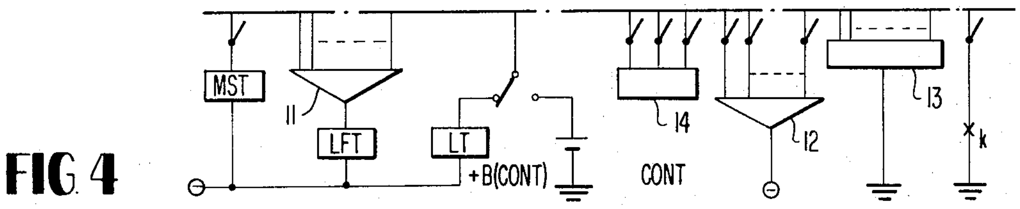
FIG. 4 shows similar circuits of a common control equipment used in the first embodiment.

Referring to FIGS. 2 through 4, the example of the controller interfaces CB of the trunk equipments comprises an additional relay K and a make contact *t*4 of the T relay. In compliance therewith, the common control equipment CONT comprises a make contact *k* of the K relay. This arrangement provides means for transmitting any information from the common control equipment CONT to the telegraph or telephone trunk equipment in that the T relay is operated. In connection with the above, it is to be noted that, if four-wire switching is resorted to in the telephone system, the common control equipment CONT should make two of the links establish a connection based on the information relating to the service class. Also, the performance test for a telegraph substation is usually different from that for a telephone substation. The link test circuit 14 should therefore carry out the test with reference to the information relating to the service class.

Figure 5:
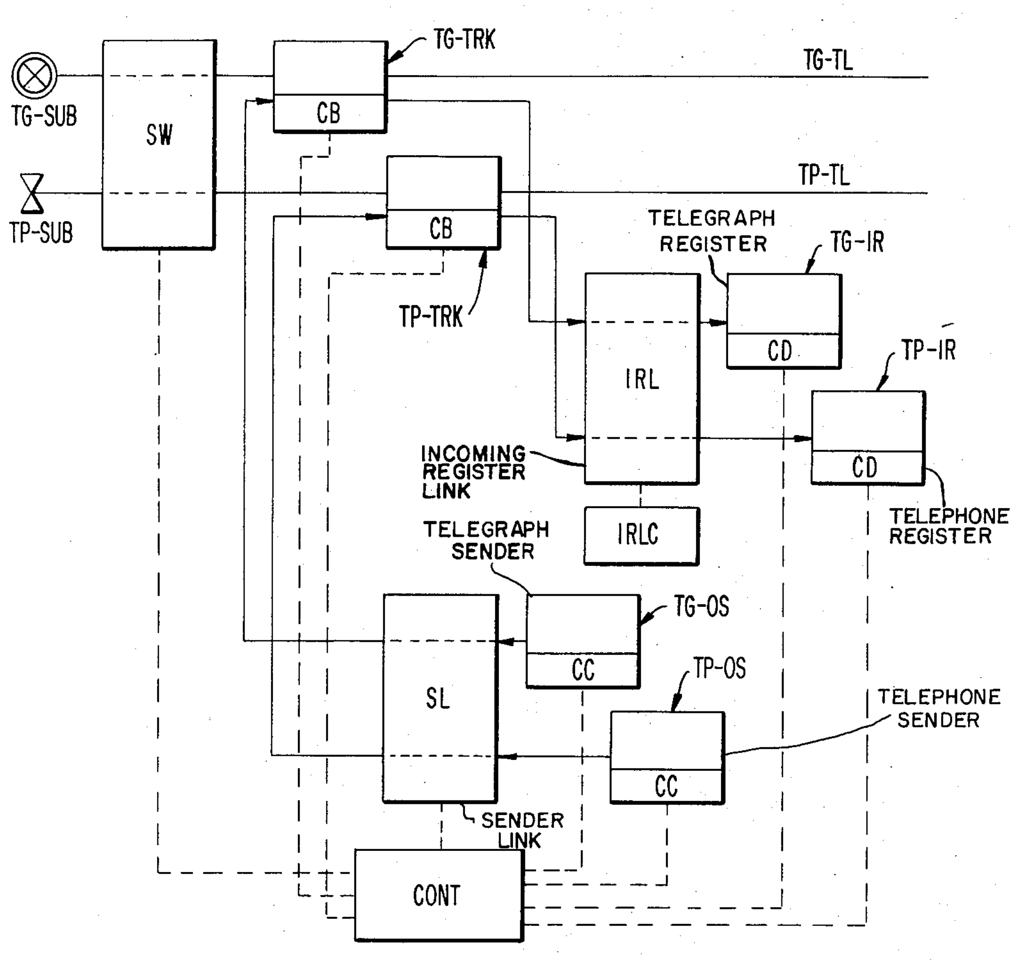
FIG. 5 is a block diagram of a second embodiment of the invention.

Referring now to FIG. 5, a second embodiment of this invention for use together with a main link frame SW for a plurality of telegraph substations, such as TG-SUB, and a plurality of telephone substations, such as TP-SUB, comprises a sender link SL having a plurality of links depicted with dashed lines, a plurality of telegraph trunk equipments, such as TB-TRK, each connected to a telegraph trunk line, a less number of telegraph senders, such as TG-OS, a plurality of telephone trunk equipment, such as TP-TRK, each connected to a telephone trunk line, a less number of telephone senders, such as TP-OS, and a common control equipment CONT for the main link frame SW and the sender link SL. The telegraph and telephone trunk equipment associated with any trunk line comprises a controller interface CB coupled to the common control equipment CONT. Each of the telegraph and telephone senders comprises a controller interface CC coupled to the common control equipment CONT. According to this invention, the controller interfaces CB of the telegraph and telephone trunk circuits are of similar construction, such as illustrated with reference to FIGS. 2 and 3. The controller interfaces CC of the telegraph and telephone senders are of like construction that is not much different from the illustration in FIGS. 2 and 3. The arrangement shown in FIG. 5 further comprises an incoming register link IRL having a plurality of links illustrated with dashed lines, an incoming register link controller IRLC, a plurality of telegraph incoming resisters, such as TG-IR, and a plurality of telephone incoming registers, such as TP-IR. Each of the telegraph and telephone incoming registers has a controller interface CD of identical structure that is not appreciably different from the controller interfaces CB illustrated with reference to FIGS. 2 and 3. In the manner known in the art, the incoming register link controller IRLC makes one of the links of the incoming register link IRL establish a connection between telegraph trunk equipment associated with a telegraph trunk line and an idle telegraph incoming register or between telephone trunk equipment associated with a telephone trunk line and an idle telephone incoming register.

Figure 6:
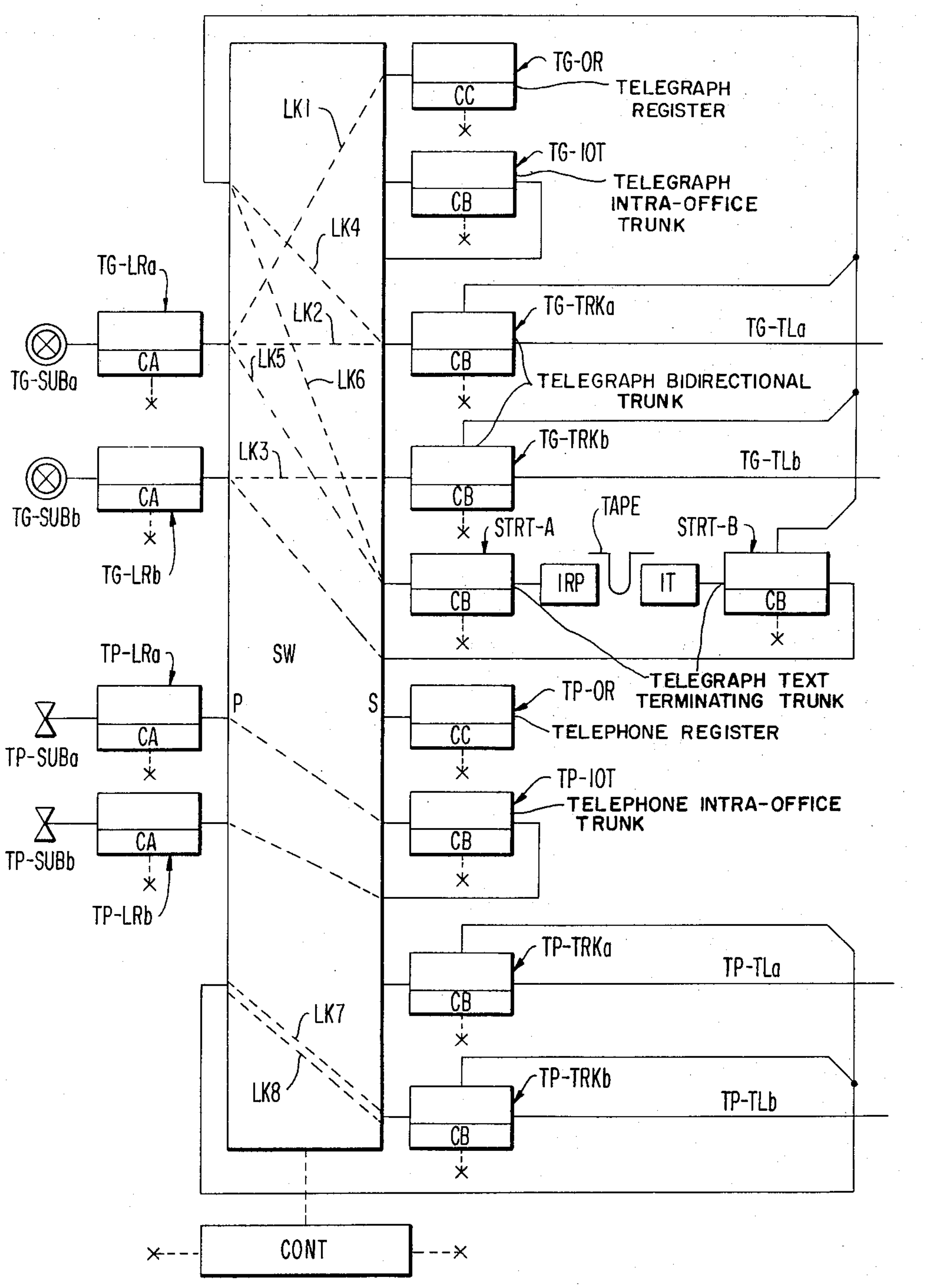
FIG. 6 is a block diagram of a third embodiment of this invention.

Referring to FIG. 6, a third embodiment of this invention comprises a main link frame SW having a plurality of links LK1 through LK8 for connecting the primary side P and the secondary side S of the main link frame SW, a plurality of telegraph substations TG-SUBa and TG-SUBb, a plurality of telegraph line circuits TG-LRa and TG-LRb connected between the respective telegraph substations and the primary side, a plurality of telegraph registers, such as TG-OR, each connected to the secondary side, a plurality of telegraph intra-office trunks, such as TG-IOT, each connected to two positions on the secondary side, a plurality of telegraph bidirectional trunks TG-TRK*a* and TG-TRK*b*, each connected to a telegraph trunk line TG-TL*a* or TG-TL*b*, to the primary side, and to the secondary side, a telegraph text terminating trunk STRT-A connected to the secondary side, an intra-office reperforator IRP connected to the terminating trunk STRT-A, an intra-office transmitter IT operable in response to a tape TAPE perforated by the reperforator IRP, a telegraph text outward trunk STRT-B connected to the transmitter IT, to the primary side, and to the secondary side, a plurality of telephone substations TP-SUB*a* and TP-SUB*b*, a plurality of telephone line circuits TP-LR*a* and TP-LR*b* connected between the respective telephone substations and the primary side, a plurality of telephone registers, such as TP-OR, each connected to the secondary side, a plurality of telephone intra-office trunks such as TP-IOT, each connected to two positions on the secondary side, a plurality of telephone bidirectional trunks TP-TRKa and TP-TRKb, each connected to a telephone trunk line TP-TL*a* or TP-TL*b*, to the primary side, and to the secondary side, and common control equipment CONT. Each of the telegraph and telephone line circuits has a controller interface CA coupled to the common control equipment CONT. Each of the telegraph and telephone trunks has a controller interface CB coupled to the common control equipment CONT. Each of the telegraph and telephone registers TG-OR and TP-OR has a controller interface CC coupled to the common control equipment CONT. In response to a call originating with a local telegraph substation TG-SUB*a* or TG-SUB*b*, the common control equipment CONT makes a link, such as LK1, establish a connection between the associated telegraph line circuit and a telegraph register TG-OR. In compliance with a telegraph outgoing call, the common control equipment CONT makes a link, such as LK2, establish a connection between the telegraph line circuit connected to a call originating telegraph substation and one of the telegraph bidirectional trunks connected to the telegraph interoffice trunk lines of the route determined by the call. In compliance with a telegraph incoming call, the common control equipment CONT makes a link, such as LK3, establsh a connection between the telegraph bidirectional trunk connected to the connection requesting telegraph interoffice trunk line and a telegraph line circuit connected to the called local telegraph substation. In accordance with a telegraph transit call, the common control equipment CONT makes a link, such as LK4, establish a connection between the telegraph bidirectional trunk connected to the connection requesting telegraph interoffice trunk line and one of the telegraph bidirectional trunks connected to the telegraph interoffice trunk lines of the route determined by the transit call. In response to a telegraph outgoing call requesting intra-office transmission switching, the common control equipment CONT makes a link, such as LK5, establish a connection based on the information relating to the service class between the telegraph line circuit connected to the call originating telegraph substation and the telegraph text terminating trunk STRT-A. When the texts perforated in a tape TAPE are to be sent out, the common control equipment CONT makes a link, such as LK4, establish a connection with reference to the information relating to the route specified by the texts and to the service class between the telegraph text outward trunk STRT-B and one of the telegraph bidirectional trunks connected to the telegraph interoffice trunk lines of the specified route. In compliance with a telegraph transit call requesting the intra-office transmission switching, the common control equipment CONT makes a link such as LK6, establish a connection based on the information relating to the service class between the telegraph bidirectional trunk connected to the connection requesting telegraph interoffice trunk line and the intra-office transmission switching means and similarly makes another link, such as LK4, establish a connection between the latter and one of the telegraph bidirectional trunks connected to the telegraph interoffice trunk lines of the specified route. If four-wire switcing should be used for a telephone transit call, the common control equipment CONT makes two links, such as LK7 and LK8, establish the requested connection.

What is claimed is:

1. A common control switching network for direct-current and alternating-current signals including a link device, a plurality of direct-current devices each capable of conveying a direct-current signal and a control signal accompanying said direct-current signal, a plurality of alternating-current devices each capable of conveying an alternating-current signal and a control signal accompanying said alternating-current signal, and common control equipment, responsive to the control signal accompanying a direct-current signal, for causing said link device to establish a connection between two of said direct-current devices and responsive to the control signal accompanying an alternating-current signal for causing said link device to establish a connection between two of said alternating-current devices wherein the improvement comprises:

a plurality of links provided in said link device, each capable of transmitting either direct-current or alternating-current signals, and an interface device provided in each of said direct-current and alternating-current devices for transmitting the control signal accompanying a direct-current or alternating-current signal between the direct-current or alternating-current device producing the control signal and said common control equipment, said common control equipment causing one of said links to establish said connection.

* * * * *

UNITED STATES PATENT OFFICE
CERTIFICATE OF CORRECTION

Patent No. 3,819,868 Dated June 25, 1974

Inventor(s) Kazuya Ozeki et al

It is certified that error appears in the above-identified patent and that said Letters Patent are hereby corrected as shown below:

In The Abstract:

Line 10 - after "or" delete "the"

In The Specification.

Column 1, line 67 - after "device" insert -- , --

Column 3, line 44 - delete "the" and insert -- this --

Column 5, line 42 - delete "socalled" and insert -- so-called --

Column 6, line 47 - delete "connected to ground" and insert -- connecting -- line 48 - after "link" insert -- connected to ground -- line 68 - delete "cell" and insert -- call -- line 48 - after "relay" insert -- . --

Signed and sealed this 5th day of November 1974.

(SEAL)
Attest:

McCOY M. GIBSON JR.
Attesting Officer

C. MARSHALL DANN
Commissioner of Patents